Patented Apr. 19, 1932

1,854,895

UNITED STATES PATENT OFFICE

AUGUSTE FERNBACH, OF PARIS, FRANCE, ASSIGNOR TO UNION SOLVENTS CORPORATION, A CORPORATION OF DELAWARE

ACETONO-BUTYLIC FERMENTATION PROCESS

No Drawing. Application filed July 17, 1930, Serial No. 468,738, and in France July 23, 1929.

The present invention relates to methods for producing the acetono-butylic fermentation of substances containing saccharose.

In the methods for producing the acetono-butylic fermentation of starchy matter described previously by the present inventor, the bacteria employed are all capable of secreting enzymes which attack the starch; they have no difficulty in developing and the fermentation takes place very readily. But if one attempts to extend this method to raw material containing saccharose, of the type of cane or beet molasses, it is found to be impossible to obtain a complete and regular fermentation giving satisfactory industrial yields, and for the following reasons:

1. The saccharose will not ferment until hydrolized and converted into invert sugar;
2. The mash to be fermented should contain a sufficient amount of nitrogenous food for the acetono-butylic bacteria and this is frequently not the case with cane and beet molasses;
3. But even when the saccharose has been hydrolized and nitrogenous food material for the bacteria is present in sufficient quantities in the mash, fermentation may be restrained or even stopped by the action of the caramelized substances in the molasses, the latter having a marked antiseptic action on the acetono-butylic bacteria.

One of the objects of the invention is to provide a process operative to (1) invert the saccharose (2) provide nitrogenous food material for the fermenting bacteria and (3) remove the deleterious caramelized substances present in beet and cane molasses.

Other objects will appear in the course of the detailed description now to be given.

The process may be carried out in the following way:

The saccharose in the beet or cane molasses is first hydrolyzed by means of invertase. Preferably, beer yeast or a pressed, baker's yeast is used as a source of invertase, these materials containing a sufficient quantity of the latter, so that 1 to 2 kilograms of the yeast will completely invert at least 100 kilograms of sugar. The molasses solution is first diluted, then heated to 50°–55° C. (to prevent proliferation of the yeast and alcoholic fermentation) and maintained at the latter temperature until inversion is completed. The sucrose remains active at this temperature and, to insure maximum activity thereof, the pH of the solution should be adjusted to lie between the values 4.3 and 4.5 inclusive.

During hydrolysis at this temperature, the proteins in the yeast cells undergo proteolysis in progressive stages and pass through the cell walls into the solution when their molecule has become sufficiently degraded. The solution is, therefore, enriched in nitrogenous food material to be used by the bacteria in the acetono-butylic fermentation process.

The solution is then boiled so as to destroy the yeast and still further enrich the solution in nitrogenous and other food material for bacteria.

Finally, the caramelized substances are removed by filtering the solution through any suitable form of activated carbon, charcoal or other equivalent adsorbing material.

The clarified solution thus obtained contains (1) the sugar in its inverted form and (2) nitrogenous material suitable for bacterial cultures, but is free of caramelized substances. Its pH is then adjusted to values lying between 5 and 6 and the bacteria producing the acetono-butylic fermentation are then added and will develop therein in the usual way under optimum conditions.

While the invention has been described particularly in relation to the treatment of molasses solutions, it is obviously applicable to any sugar-containing solution relatively poor in nitrogenous substances.

Obviously, when the raw material to be treated contains nitrogenous substances, the saccharose could be hydrolyzed and inverted by treatment with an acid; but in such a case some of the sugar would be destroyed and furfural would be produced. The use of invertase is then, even under such conditions, to be preferred, the latter being provided by a yeast or other source.

What I claim is:

1. The process of preparing a fermented liquid containing acetone and butyl alcohol from a molasses solution comprising the steps of adding yeast to said molasses solution and heating the latter to a temperature of 50°–55° C., whereby the saccharose in the molasses solution is hydrolyzed and the proteins in the yeast undergo proteolysis, hydrolysis under these conditions also preventing alcoholic fermentation, boiling the solution so as to destroy the yeast and enrich the solution in nitrogenous material, and adding a culture of bacteria capable of transforming sugars into acetone and butyl alcohol.

2. The method of preparing a fermented liquid containing acetone and butyl alcohol from a molasses solution comprising the steps of adding yeast to the molasses solution, heating the solution to a temperature sufficient to effect enzymatic hydrolysis of the sugar and of the proteins while preventing alcoholic fermentation, boiling the solution to destroy the yeast and to enrich said solution in nitrogenous matter, passing the solution through a carbonaceous material to remove caramelized substances, and adding a culture of bacteria capable of transforming sugars into acetone and butyl alcohol.

3. The process of preparing a fermented liquid containing acetone and butyl alcohol from a molasses solution comprising the steps of adding yeast to said molasses solution, adjusting the pH of the solution to a value of 4, 3,—4, 5, heating the solution to a temperature sufficient to effect enzymatic hydrolysis of the sugar and of the proteins while preventing alcoholic fermentation, boiling the solution to destroy the yeast and to enrich said solution in nitrogenous matter, passing the solution through a carbonaceous material to remove caramelized substances, adjusting again the pH of the solution to a value comprised between 5 and 6, and adding a culture of bacteria capable of transforming sugars into acetone and butyl alcohol.

In testimony whereof I have signed this specification.

AUGUSTE FERNBACH.